US012700313B2

(12) United States Patent
Bondier et al.

(10) Patent No.: US 12,700,313 B2
(45) Date of Patent: Aug. 4, 2026

(54) METHOD FOR CREATING AN ARTIFICIAL HORIZON

(71) Applicant: AMPERE S.A.S., Boulogne Billancourt (FR)

(72) Inventors: Cedric Bondier, Guyancourt Cedex (FR); Stefania Sesia, Guyancourt Cedex (FR); Nicolas Suet, Guyancourt Cedex (FR)

(73) Assignee: AMPERE S.A.S., Boulogne Billancourt (FR)

( * ) Notice: Subject to any disclaimer, the term of this patent is extended or adjusted under 35 U.S.C. 154(b) by 0 days.

(21) Appl. No.: 18/835,934

(22) PCT Filed: Jan. 20, 2023

(86) PCT No.: PCT/EP2023/051406
§ 371 (c)(1),
(2) Date: Aug. 5, 2024

(87) PCT Pub. No.: WO2023/148023
PCT Pub. Date: Aug. 10, 2023

(65) Prior Publication Data

US 2025/0148916 A1 May 8, 2025

(30) Foreign Application Priority Data

Feb. 7, 2022 (FR) ...................................... 2201036

(51) Int. Cl.
*G08G 1/00* (2006.01)
*G08G 1/052* (2006.01)
(Continued)

(52) U.S. Cl.
CPC ............. *G08G 1/161* (2013.01); *G08G 1/052* (2013.01); *G08G 1/096766* (2013.01); *G08G 1/165* (2013.01); *G08G 1/166* (2013.01)

(58) Field of Classification Search
CPC .. G08G 1/161; G08G 1/052; G08G 1/096766; G08G 1/165; G08G 1/166
See application file for complete search history.

(56) References Cited

U.S. PATENT DOCUMENTS 6,405,128 B1 * 6/2002 Bechtolsheim .... G01C 21/3667 340/988
8,046,162 B2 * 10/2011 Nonaka ............. G08G 1/09675 701/423
(Continued)

FOREIGN PATENT DOCUMENTS

EP 502 625 A1 6/2019

OTHER PUBLICATIONS

International Search Report mailed on Mar. 15, 2023 in PCT/EP2023/051406 filed on Jan. 20, 2023 (2 pages).
(Continued)

*Primary Examiner* — Truc M Do
(74) *Attorney, Agent, or Firm* — Oblon, McClelland, Maier & Neustadt, L.L.P.

(57) ABSTRACT

A method for creating an artificial horizon for a motor vehicle includes receiving input data relating to the motor vehicle and to its surroundings; determining different paths; and generating messages characterizing the artificial horizon, including long messages for characterizing events, each long message having multiple fields including at least a first field relating to a type of attribute characterizing the event and a second field indicating the value of the attribute. The first field can have at least two distinct values associated with a corresponding number of temporary event categories, the categories being separated according to their speeds and/or their positions relative to the motor vehicle.

11 Claims, 1 Drawing Sheet

(51) Int. Cl.
*G08G 1/0967* (2006.01)
*G08G 1/16* (2006.01)

(56) References Cited

U.S. PATENT DOCUMENTS

| | | | | |
|---|---|---|---|---|
| 10,967,868 | B2 | 4/2021 | Pu | |
| 2002/0077741 | A1* | 6/2002 | Hanebrink | G01C 21/26 701/117 |
| 2018/0158329 | A1* | 6/2018 | Benhammou | G08G 1/07 |
| 2018/0174449 | A1* | 6/2018 | Nguyen | G08G 1/012 |
| 2019/0184986 | A1 | 6/2019 | Hovasapyan et al. | |
| 2020/0033153 | A1 | 1/2020 | Schneider et al. | |
| 2020/0205199 | A1* | 6/2020 | Newman | H04L 1/1887 |
| 2021/0068079 | A1* | 3/2021 | Sahin | H04W 4/40 |
| 2021/0319691 | A1* | 10/2021 | Merwaday | G08G 1/0116 |
| 2022/0130236 | A1* | 4/2022 | Reimann | H04B 7/0626 |
| 2023/0168095 | A1* | 6/2023 | Lee | G06N 3/0499 |
| 2023/0179969 | A1* | 6/2023 | Pateromichelakis | H04L 41/0894 370/329 |

OTHER PUBLICATIONS

Preliminary French Search Report dated Aug. 30, 2022 in French Application 2201036 filed on Feb. 7, 2022 (3 pages, with English Translation of Categories of Cited Documents).

* cited by examiner

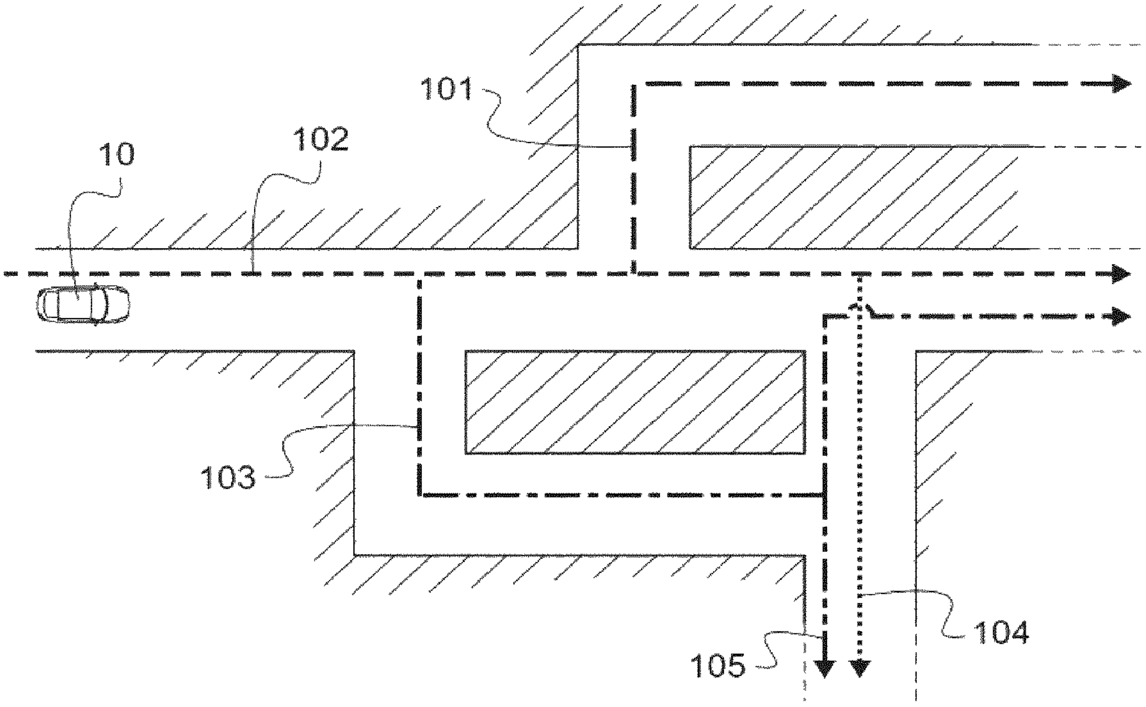
101
102
10
103
104
105

METHOD FOR CREATING AN ARTIFICIAL HORIZON

TECHNICAL FIELD OF THE INVENTION

The present invention generally relates to interfacing systems allowing motor vehicles to comprehend their exterior environment. It here relates to generation of artificial horizons, i.e. to the data processing allowing the vehicle to construct a map of its environment.

The invention thus more specifically relates to a method for preparing an artificial horizon for a motor vehicle, comprising steps of:

- receiving input data relating to the motor vehicle and to its environment,
- determining various paths able to be taken by the motor vehicle, and
- generating messages characterizing said artificial horizon.

Here, a plurality of types of messages are able to be prepared, including:

- messages regarding positional attributes of the motor vehicle,
- messages regarding positional attributes of each path,
- messages characterizing each path,
- short and long messages characterizing events found on each path, each of the long messages containing a plurality of fields, including at least a first field relative to a type of attribute characterizing the event and a second field indicating the value of this attribute.

The invention also relates to a motor vehicle comprising software clients (among which a human-machine interface and/or a navigation system and/or advanced driver-assistance systems) and a main interface that is programmed to implement a preparing method such as mentioned above, in order to deliver to each client at least one portion of the prepared artificial horizon.

PRIOR ART

At the present time, many vehicles are equipped with embedded driver aids that allow the driver to be helped with driving, whether in dangerous driving situations or simply to improve driving comfort.

For example, the following embedded systems are known: navigation systems, which help the driver to follow a route from a start point to an end point; advanced driver-assistance systems (ADAS); and human-machine interfaces (HMI), which display or transmit alerts while the vehicle is being driven.

To operate effectively, embedded systems must probe and analyze the environment both nearby and relatively far from the vehicle. To this end, the vehicle is equipped with physical sensors that collect information on the surroundings of the vehicle.

To further improve knowledge of its environment, the vehicle may also be equipped with V2X technology, through which it receives messages from remotely located transmitters, for example other vehicles (so-called V2V technology), road infrastructure (so-called V2I technology), a network (so-called V2N technology) or indeed other road users such as pedestrians (so-called V2P technology).

The messages received from these transmitters contain information of various natures, such as: the absolute position (in GPS co-ordinates) of the transmitter, the reliability of this position, the speed of movement of the transmitter, the acceleration of the transmitter and/or its direction of movement, or even hazards that the transmitter has encountered or created during its movement (slippery road, dangerous bend, accident, traffic congestion, etc.).

It has thus been estimated that, with the deployment of V2X technology in more and more vehicles and the development of 5G, the amount of information that will be received per second in a vehicle will be such that it will become necessary to select the most useful, as otherwise there will be a risk of operation of the systems embedded in the vehicle slowing down or becoming saturated.

In this context, a number of vehicle manufacturers have joined forces to create a protocol called ADASIS, which stands for Advanced Driver-Assistance Systems Interface Specification. This protocol, and in particular version V2 thereof, is designed to describe the geometry of the road ahead of the vehicle and to characterize its environment via a high but limited number of parameters. This protocol is thus said to allow an artificial horizon to be created. According to this protocol, the environment is described not in terms of road segments, but rather in terms of paths able to be taken by the motor vehicle. A primary path on which the vehicle is located, and secondary paths that originate on the primary path or on other secondary paths are thus defined.

This protocol is designed so that the artificial-horizon provider (which operates according to this protocol) may send six types of messages to embedded systems (which are called "clients").

These types of messages are as follows:

- position messages relating to the position of the vehicle,
- stub messages relating to the position of the start point of the path in question,
- segment messages characterizing the main attributes of one particular section of the path in question,
- short profile messages characterizing events located on each path expressible in 10 bits,
- long profile messages characterizing events located on each path expressible in 32 bits,
- metadata messages.

This protocol makes it possible to deliver to clients data on the environment that are accurate and easily exploitable, and the number of which varies from client to client. Typically, most clients (for example cruise-control systems) only need data on the primary path. In contrast, other clients need more data, in particular data on events present on secondary paths (to verify for example whether a prioritized vehicle is taking one of these secondary paths).

However, even with this protocol, the number of data to be processed by the computers of the vehicle remains very high, to the point that the problem of slow-down or saturation remains.

Furthermore, this protocol is designed to transmit only data relating to permanent events (signs, intersections, etc.) and hence it provides limited information.

Presentation of the Invention

In order to remedy the aforementioned drawbacks of the prior art, the present invention makes provision to supplement the aforementioned ADASIS protocol (version 2) by adding an additional dynamic layer in order to transmit information relating to temporary "events" (objects or circumstantial situations) that are relevant to clients, distinguishing events according to their nature.

More particularly, the invention provides a method for preparing an artificial horizon such as defined in the introduction, wherein the first field of a long message is able to take at least two separate values associated with a corresponding number of respective predefined categories of temporary (i.e. short-lived, non-permanent) events, said categories being grouped by speed of the temporary event and/or position of the temporary event relative to the motor vehicle.

Thus, the invention makes provision to use the long messages of the ADASIS protocol to transmit data encoded in a particular way. In particular, the first field (relative to the type of attribute) is able to take a first value indicating that the second field (value of the attribute) will contain data relating to dynamic temporary events, or a second value indicating that the field will contain data relating to temporary events that are static or almost static (i.e. considered to be static even though they are not exactly). The second field will then itself potentially be encoded to receive not just a value, but a juxtaposition of data characterizing a plurality of aspects of the temporary event (its speed, its position in terms of traffic lane, etc.).

In this way, it is possible to effectively deliver to clients only information useful thereto, by exploiting data describing map information and adding attributes to indicate the presence of particular objects.

The advantage of distinguishing dynamic events from static events is that, to characterize these two types of events, the same attributes are not employed. Hence, only relevant attributes will be encoded in each message, since each message will be associated with only one category of events.

It will moreover be noted that the way employed to characterize these events will be such that it will not be necessary (contrary to what is done in general according to the ADASIS protocol) to send a termination message when an event is updated (for example its position). By way of example, using the identifier of the event, it will be possible to directly transmit the updated version of the event, without having to delete the previous version. This will allow the number of messages sent to be decreased.

As will be clearly explained in the rest of the description, this implementation will further avoid transmission of the same kind of information a plurality of times, in order to avoid overloading the computers.

The following are other advantageous and non-limiting features of the preparing method according to the invention, which may be implemented individually or in any technically possible combination:

- one category of events corresponds to dynamic events, one category of events corresponds to events that are static or almost static with respect to the motor vehicle, and one category of events corresponds to traffic lights;
- an event is considered dynamic when its speed is greater than a first threshold and/or when its distance to the motor vehicle is greater than a second threshold;
- the first threshold and/or the second threshold is a function of the speed of the motor vehicle and/or of the speed of the event and/or of the environment;
- when the speed and/or distance to the motor vehicle of an event varies over time, the value of the first field is able to change;
- at least one of the following events is considered dynamic:
  - a responding emergency vehicle,
  - a vehicle an emergency braking system of which is activated,
  - a vehicle a reversible occupant restraint system of which is activated,
  - a person or animal on the path,
  - mobile roadworks on the path,
  - a vehicle driving contraflow,
  - mobile rescue and recovery work in progress,
  - a vehicle driving at least one third slower than the maximum permissible speed,
  - a vehicle causing a risk of collision,
  - a vehicle violating traffic laws,
  - a dangerous situation;
- at least one of the following events is considered static:
  - an accident,
  - roadworks,
  - an impassable path segment,
  - adverse weather conditions,
  - an area where aquaplaning has been observed,
  - a hazardous area,
  - an area where rescue and recovery work is in progress,
  - a stationary vehicle,
  - a dangerous end of queue;
- each long message associated with a temporary-event category contains two fields allowing each event to be identified in two separate ways;
- the input data are at least partly derived from a decentralized event notification message and/or a co-operative awareness message sent by a third-party vehicle.

The invention also relates to a motor vehicle comprising software clients (among which a human-machine interface and/or a navigation system and/or advanced driver-assistance systems) and a main interface that is programmed to implement a preparing method such as mentioned above, in order to deliver to each client at least one portion of the prepared artificial horizon.

The following are other preferred features of the preparing method according to the invention:

- only events located on a primary path (also called the most probable path in the ADASIS protocol), at a distance from the vehicle less than a threshold, are considered in messages sent to clients (this allowing the amount of information sent, and therefore the bandwidth required to send it, to be decreased);
- this threshold is less than the distance over which the client receives mapping information;
- the input data delivered to the motor vehicle by surrounding vehicles are also delivered to the client via the long messages, even if a potentially hazardous situation has not been detected;

Dynamic Events:

- a dynamic event is identified by virtue of the path-index field of the standard ADASIS interface and by virtue of the field "ID",
- 6 bits are used to discriminate between dynamic events in the path index and one particular value is used to indicate that all possible values of the ID field are used;
- the values of the ID field are selected in ascending order;
- the values of the ID field allow dynamic events to be tracked as long as they belong to the same road segment and allow the position thereof to be updated without terminating the event;
- provision is made to send a specific message when the dynamic event no longer belongs to the initially identified path index, thus freeing up the corresponding value of the ID field;
- a specific value is used to indicate that more than 63 objects are present in the path index;
- in such a case, referred to as overflow, when a new dynamic event must be delivered to the client, the decision as to which event to prioritize is made depending on the distance between the event and the vehicle;
- thus, if the new event is further from the vehicle than all the events already transmitted, then the new event is rejected, otherwise the furthest event is rejected and the new event is used by using the value of the ID field thus freed;

specific attributes that describe the cause and sub-cause of the dynamic event are described on 7 bits;

a specific attribute that represents the age of the dynamic event is described on 10 bits;

this attribute represents time with an accuracy of 10 ms covering 10 seconds;

a specific attribute that represents the lane is described on 4 bits;

this specific attribute indicates in which lane the dynamic event is located (lane number, or shoulder);

a specific attribute that represents the direction is described on 2 bits;

this attribute indicates whether the dynamic event is advancing or receding;

a specific attribute, which is called "value", represents the speed of the dynamic event; it is described on 5 bits;

an attribute that indicates the cause and sub-cause is described on 9 bits, 5 bits of which are for the cause;

Static (or Almost Static) Events:

a static event is identified by virtue of the path-index field of the standard ADASIS interface and by virtue of the field "ID";

7 bits are used to discriminate between static events in the path index and one particular value is reserved to indicate that all the values of the ID field are used;

the values of the ID field are selected in ascending order;

these values allow static events to be tracked as long as they belong to the same path segment and allow the position thereof to be updated without terminating the event;

provision is made to delete a specific message when the static event no longer belongs to the initially identified path index, thus freeing up the corresponding value of the ID field;

a specific value is used to indicate that more than 127 objects are present in the specific index and that overflow has occurred;

overflow is handled in the same way as for dynamic events;

an attribute called "value" is used to indicate the duration of the static event;

the value 0 is used to indicate that the event has no length, whereas values from 1 to 62 are used to indicate the length of the static event;

length is not uniformly encoded and accuracy decreases as length increases;

lengths from 0 to 100 meters are encoded in increments of 4 meters, whereas an increment of 16 m is used for lengths between 100 and 500 m, an increment of 128 m is used for lengths between 500 and 1908 m and a value of 62 is used to indicate lengths greater than 1908 m;

the value 63 is used to invalidate or delete the static event;

an attribute called start lane, described on 5 bits, indicates the first lane number for which the static event is valid;

off-road static events are associated with a start lane of 0 whereas the shoulder is associated with a lane number of 1 and lanes are numbered from lane 2 to lane 31;

an attribute called end lane, described on 5 bits, indicates the last lane number for which the static event is valid;

Traffic-Light Events:

traffic-light events are associated with changes in traffic-light phases;

a field of the message related to such an event is called a "traffic maneuver"—mapped on 2 bits, it indicates whether the communicated phase is valid for continuing straight, turning left or turning right;

another field, called the "current phase", which is located on 3 bits, indicates the color of the current phase;

another field, called the "following phase", which is also communicated on 3 bits, indicates the next color of the following phase;

yet another field, called the "time of the following phase", which uses 16 bits, indicates the time at which the following phase will occur, preferably with an increment of 100 ms;

in this field, the range of values runs from 0 to 36000;

the value 36001 is the value if the following phase is in more than 1 hour;

the value 65535 is used when the traffic lights are turned off;

another field, called the "start lane", which uses 4 bits, indicates the number of the first lane for which this phase is valid;

another field, called the "end lane", which uses 4 bits, indicates the number of the last lane for which this phase is valid;

in these last two fields, the lane number 0 is used for off-road lanes, the number 1 is used for the shoulder, and other numbers are used for the other lanes, starting with the number 2 for the rightmost lane.

Of course, the different features, variants and embodiments of the invention may be associated with one another in various combinations provided that they are not mutually incompatible or exclusive.

DETAILED DESCRIPTION OF THE INVENTION

The following description of the appended drawings, which are given by way of non-limiting example, will allow of what the invention consists and how it may be implemented to be clearly understood.

In the single appended drawing:

FIG. 1 is a view of a motor vehicle and of one portion of its environment.

FIG. 1 shows a motor vehicle 10 configured to implement the invention.

It is here a question of an automobile. As a variant, it could be a question of another type of vehicle (truck, motorcycle, bus, etc.).

Here, this motor vehicle 10 comprises, as is typical for such vehicles, a passenger compartment in which a seat for the driver of the vehicle is found, a powertrain, a braking system, and a steering system allowing the vehicle to be turned. Typically, the steering system comprises an electronically drivable power-steering actuator, the power train comprises an electronically drivable engine/motor-control actuator, and the braking system comprises an electronically drivable braking actuator.

This motor vehicle 10 is further equipped with at least one human-machine interface. In practice, it here comprises a touch screen coupled to a set of speakers.

The vehicle is here also equipped with a reversible occupant restraint system, typically a system for controllably blocking seat belts.

The motor vehicle 10 moreover comprises an electronic processing unit comprising a plurality of computers (microprocessors or microcontrollers), memories and input/output interfaces.

By virtue of its input interfaces, the electronic processing unit is able to receive various input data, which are delivered by sensors, third-party computers, or third-party entities (other vehicles, road equipment, pedestrian telephones, a network, etc.). These input data relate to the motor vehicle (speed, etc.) and to its environment (position on the road, map, etc.). In particular, V2X technology is used for this purpose.

It will be noted that these input data are, for example, derived from decentralized event notification messages (more commonly known by the acronym DENM) and co-operative awareness messages (more commonly known by the acronym CAM) sent by third-party vehicles located in the environment of the motor vehicle 10.

By virtue of its output interfaces, the electronic processing unit is able to control the human-machine interface in order to deliver information to the driver. It is also able to control the power-assisted steering actuator, the engine/motor-control actuator, and the braking actuator so as to drive the motor vehicle 10 autonomously or semi-autonomously.

By virtue of its memories, the electronic processing unit stores a computer application, consisting of computer programs (or "software") comprising instructions the execution of which by the computers allows the method described below to be implemented.

In the remainder of this description, each piece of "software" will be considered to allow one particular "function" to be implemented.

Provision is thus made for ADAS software for assisting with driving the vehicle (cruise control, lane-keeping assist, etc.). Provision is also made for HMI software for displaying information on the touch screen and emitting audio messages via the set of speakers and for navigation software that stores a map of a region and that is able in particular to determine the position of the motor vehicle 10 on this map, compute the best path to follow to reach a particular destination, and to control display of the position of the vehicle and path on the touch screen.

Each of these pieces of software forms one "client". Each client requires only one portion of the input data to be able to execute the function for which it was designed.

Thus, provision is made for a main interface between the input interface that receives the input data and these clients.

This main interface, also called the artificial-horizon provider, is then programmed to filter the input data so as to generate an artificial horizon representative of the environment of the motor vehicle 10, and to transmit this artificial horizon over the network of the vehicle.

The network of the vehicle, to which the clients are connected, is here a controller area network (CAN). Thus, the main interface is able to transmit over this network messages at regular intervals, here every 100 ms.

Each client is then able to retrieve from the network all or some of the information contained in this artificial horizon.

To this end, each client comprises a software component called the "reconstructor", which is able to read the information required for the client to be able to perform its function.

It will be noted that the artificial horizon will possibly be defined as a digital dataset allowing one portion of the environment of the vehicle (in particular events knowledge of which would be useful for driving the motor vehicle 10) to be characterized.

The processing executed by the main interface is divided into generic pre-processing, which filters the input data coarsely, and post-processing, which carries out more precise filtering, taking into account the topology of the streets where the relevant "events" (vehicles, objects, circumstantial situations) are found.

This filtering allows the clients to be offered an artificial horizon that suits them, i.e. data that sufficiently describe the vehicle and its environment but that are in number sufficiently restricted that the computing power of the clients is enough to process these data.

To this end, the main interface operates according to version 2.0 or later of the ADASIS protocol.

In this protocol the artificial horizon is represented by paths (see [FIG. 1]).

Thus, given the various branches of the road, the main interface is able to determine all the paths that the vehicle is capable of taking.

Provision is made to distinguish between a primary path 102 (for example the one that the road originally taken follows) and secondary paths 101, 103, 104, 105 that originate on the primary path 102 or other secondary paths.

Provision is further made to define each secondary path by an end (which indicates the position of its junction with the primary or secondary path where it originates) and attributes (that characterize this path).

On each path there are found events the positions of which with respect to the end are defined by a separation.

Some events are permanent (sign, hump-back bridge, etc.) whereas others are temporary.

These temporary events include objects (vehicle, etc.) and circumstantial situations (position of the end of a queue, alert, etc.).

The ADASIS protocol makes provision to consider only a limited number of paths (here 56) located ahead of the vehicle. It further makes provision to consider only a limited length of each path, here about 8 km. These limitations make it possible not to overload the computers of the vehicle. Thus, the artificial horizon has a limited range.

This protocol is thus designed so that the main interface is able to send six types of messages over the CAN (to clients). These types of messages are as follows:

- position messages relating to the position of the vehicle 10,
- stub messages relating to the position of the start of the path in question,
- segment messages characterizing the main attributes of one section of the path,
- short messages characterizing events on the path expressible on 10 bits,
- long messages characterizing events on the path expressible on 32 bits,
- metadata messages.

In the context of the present invention, it is only long messages that are of interest.

Such a long message is sent over the CAN when an event relevant to driving the vehicle 10 is detected on one of the paths, in a geographical area considered relevant.

Such a message contains a plurality of data defined by the following table.

TABLE 1

| Field | Length (in bits) | Value range |
|---|---|---|
| Message type | 3 | 5 |
| Cycle counter | 2 | 0 to 3 |
| Retransmission | 1 | 0, 1 |
| Path index | 6 | 8 to 63 |
| Separation | 13 | 0 to 8190 |

TABLE 1-continued

| Field | Length (in bits) | Value range |
|---|---|---|
| Update | 1 | 0, 1 |
| Profile type | 5 | 1 to 31, 0 |
| Control point | 1 | 0, 1 |
| Value | 32 | 0 to $2^{32}$-2, $2^{32}$-1 |

A long message is therefore encoded on 64 bits. It will be understood from this table that the first 3 bits characterize the message type, the next two are a cycle counter, etc. Therefore, each long message comprises a number of portions.

In this table, the "field" column thus indicates to what each portion of the message corresponds. The "length" column indicates the number of bits that each portion occupies in the message. The "value range" column indicates the values that each portion of the message is able to take.

Preparation of such a message, via the ADASIS protocol, is well known to those skilled in the art. Therefore, it will not be described in detail here.

It will merely be noted that the "message type" field will here always have the same value since only long messages are of interest below.

The "path index" field has a value that allows the path on which the event is located to be identified.

The "separation" field has a value that allows the event to be located on the path.

The "profile type" field allows the event to be characterized by a particular type. Thus, if its value is equal to 1, the event is a longitude, if it is equal to 2, it is a latitude, if it is equal to 3, it is an altitude, if it is equal to 8, it is a road sign, if it is equal to 9, it is a speed limit for heavy-duty trucks. It will be noted that, in the ADASIS protocol, the values 11 to 15 are reserved for standard types, and that the values 16 to 31 are reserved for specific types.

The "value" field for its part allows data corresponding to the profile type to be stored (the value of the longitude, the type of road sign, the value of the speed limit, etc.).

In summary, the "profile type" field indicates to what the datum stored in the "value" field applies. It thus designates a type of attribute characterizing the event (latitude, longitude, road sign, speed limit).

Here, an "attribute" will be defined as a characteristic of an event.

The invention makes provision to use three of the values 16 to 31 reserved for specific types to define three new types of attributes, namely the attributes of static or almost static temporary events, the attributes of dynamic temporary events and the attributes of traffic-light events.

A static event is a stationary event.

An almost static event is an event that moves little, on account of its speed and/or its position with respect to the vehicle. Thus, an event the speed of which is less than a speed threshold (for example 5 km/h) or the position of which is far from the vehicle—beyond a distance threshold (for example 1000 meters)—is considered to be almost static.

It will be noted here that each of these thresholds may be set or may be dependent on the speed of the motor vehicle 10 and/or on the speed of the event and/or on the environment. By way of example, the thresholds may increase or decrease depending on the type of environment—urban, motorway or rural environment—through which the vehicle is being driven.

An example of a static or almost static temporary event is a stationary vehicle on the path in question, or a dangerous end of queue on this path.

A dynamic event is defined in contrast to the aforementioned events. For example, it is a question of a responding emergency vehicle.

A traffic-light-event attribute for example makes it possible to deliver the current phase of the traffic light (typically its color) and the time remaining before this phase changes.

Here, dynamic temporary events are associated with the value 28.

In other words, when the "profile type" field is equal to 28, it means that the "value" field will contain a juxtaposition of a plurality of data characterizing by various aspects a dynamic temporary event.

The 32-bit "value" field is thus encoded in a number of portions of 2 to 10 bits, which are defined in the following table.

TABLE 2

| Field | Length (in bits) | Value range |
|---|---|---|
| Compressed dynamic event | 5 | 0 to 31 |
| ID | 6 | 0 to 62, 63 |
| Age | 10 | |
| Lane | 4 | 0 to 15 |
| Direction | 2 | 0 to 2 |
| Value | 5 | 0 to 30, 31 |

The "compressed dynamic event" field will be detailed below. It allows the dynamic event to be categorized.

The "ID" field allows the dynamic temporary event to be identified by a number between 0 and 62. The number 63 is reserved for the case where all the other numbers are taken. The main interface frees this number 63 up as soon as this is no longer the case.

It will be noted here that if the maximum number of dynamic events (63) is reached, it will be possible to simply warn the horizon constructor that overflow has occurred. As a variant, it will be possible to compare the new event with those already classified. If the furthest thereof (with respect to the vehicle) is further away than the new event, it will be possible to free up its ID and replace it with the ID of the new event. In the contrary case, the new event will not be taken into account.

It will be noted here that a dynamic event will be identified twice, on the one hand by this "ID" field, but also by the "path index" field used in table 1.

By virtue of this double identification, when two messages associated with the same event are sent in succession (for example because the position and/or speed of that event has changed), it will be implicit that the older message is obsolete since it is replaced by the new message. In this way, it will not be necessary to send a message to cancel a dynamic event.

By way of example, a dynamic event such as a responding vehicle driving at speed will possibly be encoded in the artificial horizon by successively sending updated long messages. In this configuration, the reconstructor of each client will understand that these messages are associated with the same responding vehicle, the speed and position of which are changing, without it being necessary to send it for this purpose messages canceling the previous messages.

The "age" field corresponds to the time that has passed since the event was generated, to the nearest 10 ms. It covers a duration of 10 s. To make it possible to understand what this field refers to, it must be recalled that, in this embodiment, a message is transmitted every 100 ms on the CAN. When a plurality of events occurs simultaneously, a plurality of messages will therefore be generated and these messages will be transmitted in succession one after another. It is therefore possible for a message to be transmitted several hundred of milliseconds or even several seconds after having been generated. In this case, the "age" field will make it possible to indicate how long ago the message was generated.

The "lane" field indicates the lane to which the event applies. This field applies to the traffic lanes of the vehicle (i.e. the lanes that the vehicle is able to take given the direction in which it is driving). Thus, events located outside of these lanes are associated with the value 0, events located in the shoulder are associated with the value 1, and events located in the traffic lanes are associated with values between 2 and 14 (2 corresponding to the leftmost lane, 3 to the lane immediately beside the leftmost lane, etc.).

The "direction" field indicates the direction in which the event is moving. It takes the value 0 if the event is moving in the same direction as the vehicle 10, and the value 1 otherwise.

The "value" field is used to encode the speed of the event. It is an approximate value. Each value corresponds to one speed range, as defined in the ADASIS protocol v2.0.4, in table 12. By way of example, the following values may correspond to the following ranges:

"1": a speed less than 5 km/h,

"2": a speed between 5 and 7 km/h,

"2": a speed between 7 and 10 km/h,

"4": a speed between 10 and 15 km/h

. . .

"28": a speed between 140 and 150 km/h,

"29": a speed greater than 150 km/h.

It will be noted that this "value" field is able to take the value 31 in one particular case. When this field is set to 31, the message means that the message sent beforehand regarding the same event (identified by the ID field) must be deleted.

The "compressed dynamic event" field indicates the type of dynamic event to which the message refers.

It will be recalled on this subject that ETSI, which is the organization responsible for the standards relating to V2X technology, has already created a table collating the various types of events. This table distinguishes between broad categories (causes) and sub-categories (sub-causes).

This table corresponds to the first four fields in the following table.

TABLE 3

| Cause description | Cause code | Sub-cause description | Sub-cause code | Compressed cause code |
|---|---|---|---|---|
| Roadworks | 3 | Slow-moving road maintenance | 3 | 1 |
| | | Street cleaning | 5 | |
| | | Winter service | 6 | |
| Human presence on the road | 12 | Unavailable | 0 | 2 |
| | | Cyclist on roadway | 2 | |
| | | Moped rider on roadway | 3 | |
| Wrong way driving | 14 | Unavailable | 0 | 3 |
| | | Vehicle driving in wrong lane | 1 | |
| | | Vehicle driving in wrong driving direction | 2 | |
| Rescue and recovery work in progress | 15 | Unavailable | 0 | 4 |
| | | Emergency vehicles | 1 | |
| | | Rescue helicopter landing | 2 | |
| | | Police activity ongoing | 3 | |
| | | Medical emergency ongoing | 4 | |
| | | Child abduction in progress | 5 | |
| Slow vehicle | 26 | Unavailable | 0 | 5 |
| | | Maintenance vehicle | 1 | |
| | | Vehicles slowing to look at an accident | 2 | |
| | | Abnormal load | 3 | |
| | | Abnormal wide load | 4 | |
| | | Convoy | 5 | |
| | | Snowplow | 6 | |
| | | De-icing or salting vehicle | 7 | |
| Emergency vehicle approaching | 95 | Unavailable | 0 | 6 |
| | | Emergency vehicle approaching | 1 | |
| | | Prioritized vehicle approaching | 2 | |
| Collision risk | 97 | Unavailable | 0 | 7 |
| | | Longitudinal collision risk | 1 | 8 |
| | | Crossing collision risk | 2 | 9 |
| | | Lateral collision risk | 3 | 10 |
| | | Collision risk involving a vulnerable road user | 4 | 11 |
| Signal violation | 98 | Unavailable | 0 | 12 |
| | | Stop sign violation | 1 | |
| | | Traffic light violation | 2 | |
| | | Turning regulation violation | 3 | |
| Dangerous situation | 99 | Unavailable | 0 | 13 |
| | | Emergency electronic brake lights | 1 | 14 |
| | | Pre-crash system activated | 2 | 15 |
| | | ESP (Electronic Stability Program) activated | 3 | 15 |
| | | ABS (Anti-lock Brake System) activated | 4 | 15 |
| | | AEB (Automatic Emergency Braking) activated | 5 | 14 |
| | | Brake warning activated | 6 | 14 |
| | | Collision risk warning activated | 7 | 14 |
| Dynamic status of the object | | Unavailable | | 0 |

It will be noted, in this table, that each cause is defined by a first code (second column) and each sub-cause is defined by a second code (fourth column).

This classification makes provision to leave many cause codes free (thus the codes pass directly from 3 to 12), hence storing the cause values requires a high number of bits (in the present case, 7 are required).

Here, the idea is to replace the cause code with a compressed cause code, indicated by the last column of the above table. Thus, it is possible to encode the compressed cause code and the sub-cause code on a small number of bits, here 5 bits. These two codes are then stored in the "compressed dynamic event" field.

Here, static or almost static temporary events are associated with the value 29.

In other words, when the "profile type" field is equal to 29, it means that the "value" field will contain a juxtaposition of a plurality of data characterizing by various aspects a static or pseudo-static temporary event.

The 32-bit "value" field is thus encoded in a number of portions of 2 to 7 bits, which are defined in the following table.

TABLE 4

| Field | Length (in bits) | Value range |
|---|---|---|
| Compressed event | 5 | 0 to 31 |
| Sub-cause | 4 | 0 to 15 |
| ID | 7 | 0 to 126, 127 |
| Value | 6 | 0 to 62, 63 |
| Start lane | 4 | 0, 1, 2 to 31 |
| End lane | 4 | 0, 1, 2 to 31 |
| Confidence | 2 | 0 to 3 |

The "compressed event" and "sub-cause" fields will be detailed below. They allow the static or almost static event to be characterized.

The "ID" field allows the event to be identified by a number between 0 and 126. The number 127 is reserved for the case where all the other numbers are taken. As with the same field in the case of a dynamic event, the main interface is programmed to free up this number as soon as this is no longer the case and to select closer events before those that are further away when all the numbers are taken.

Once again, a static or almost static event will be identified twice, on the one hand by this "ID" field, and on the other hand by the "path index" field used in table 1. By virtue of this double identification, it will become implicit that a static event has been canceled and replaced by the information contained in a new message.

The "value" field is used to encode the length L of the event. It takes the value 0 if the length is not known. Otherwise, it takes a value between 1 and 62. Its value then depends on the length of the event. Its value here is encoded as follows:

- if the length is between 0 and 100 m, its value is equal to the integer part of L/4,
- if the length is between 100 and 500 m, its value is equal to the integer part of (L−100)/16+25,
- if the length is between 500 and 1908 m, its value is equal to the integer part of (L−500)/128+50,
- if the length is greater than 1098 m, its value is 62.

It will be noted that this "value" field is able to take the value 63 in one very particular case. The value 63 will indicate that the message relates to a static event that must be deleted, thus freeing up the identifier of the "ID" field used.

The "start lane" field indicates the first lane to which the event applies. This field is encoded in the same way as the aforementioned "lane" field.

The "end lane" field indicates the last lane to which the event applies. This field is encoded in the same way as the "start lane" field.

The "confidence" field indicates the level of confidence in the event detection, the value 0 indicating a minimum level of confidence and the value 3 indicating a maximum level of confidence.

The "compressed event" field is encoded on 5 bits.

To define this field, it will be noted that ETSI has already created a table collating the various types of static event that a vehicle may encounter. This table distinguishes between broad categories (causes) and sub-categories (sub-causes).

Although the sub-causes are once again encoded by natural integers of low values (meaning that few bits are required to encode them), the same does not go for the causes.

Thus, the "sub-cause" field employs without modification the numbers assigned by ETSI, while the "compressed event" field employs numbers different from those assigned by ETSI.

The following table indicates the correspondence between the ETSI numbers and the numbers employed here to encode them on a low number of bits.

TABLE 5

| Type | ETSI cause code | Compressed event |
|---|---|---|
| Traffic condition | 1 | 1 |
| Accident | 2 | 2 |
| Roadworks | 3 | 3 |
| Impassability | 5 | 4 |
| Adverse weather conditions - Adhesion | 6 | 5 |
| Aquaplaning | 7 | 6 |
| Hazardous location - Surface condition | 9 | 7 |
| Hazardous location - Obstacle on the road | 10 | 8 |
| Hazardous location - Animal on the road | 11 | 9 |
| Human presence on the road | 12 | 10 |
| Wrong way driving | 14 | 11 |
| Rescue and recovery work in progress | 15 | 12 |
| Adverse weather conditions - Extreme weather condition | 17 | 13 |
| Adverse weather conditions - Visibility | 18 | 14 |
| Adverse weather conditions - Precipitation | 19 | 15 |
| Slow vehicle | 26 | 16 |
| Dangerous end of queue | 27 | 17 |
| Vehicle breakdown | 91 | 18 |
| Post crash | 92 | 19 |
| Human problem | 93 | 20 |
| Stationary vehicle | 94 | 21 |
| Emergency vehicle approaching | 95 | 22 |
| Hazardous location: indication - Dangerous curve | 96 | 23 |

At this stage, it will be noted that a static event may become dynamic or vice versa. In this case, a new long message corresponding to the new category of the event will be sent over the CAN.

Traffic-light events are associated with the value 30.

In other words, when the "profile type" field is equal to 30, it means that the "value" field will contain a juxtaposition of data that characterizes the state of a traffic light.

It will be noted that if the traffic light is located at an intersection, a separate message may be sent for each direction in the intersection, even if the same light and the same phase are valid for continuing straight and for turning right or left.

The 32-bit "value" field is thus encoded in a number of portions of 2 to 16 bits, which are defined in the following table.

TABLE 6

| Field | Length (in bits) | Value range |
|---|---|---|
| Traffic-light direction | 2 | 0 to 3 |
| Current phase | 3 | 1 to 7 |
| Following phase | 3 | 1 to 7 |
| Time to following phase | 16 | 0 to 36000 |
| Start lane | 4 | 0, 1, 2 to 15 |
| End lane | 4 | 0, 1, 2 to 15 |

The "traffic-light direction" field indicates with which traffic lane the event is associated. It takes the value 0 if it is associated with the initial direction (straight ahead), the value 1 for turning left, the value 2 for turning right, and the value 3 for all directions.

The "current phase" field indicates the current phase of the traffic light. It takes the value 1 if it is green, 2 if it is red, 3 if it is amber, 4 if it is between amber and red, 5 if it is flashing red, 6 if it is flashing amber, and 7 if it is turned off.

The “following phase” field indicates the next phase of the traffic light. Its value is defined in the same way as for the current-phase field.

The “time to following phase” field indicates, depending on Universal Time UTC, the time at which the following phase will occur.

The “start lane” field indicates the first lane to which the event applies. This field is encoded in the same way as the aforementioned “lane” field.

The “end lane” field indicates the last lane to which the event applies. This field is encoded in the same way as the “start lane” field.

The “time to following phase” field will possibly more precisely be encoded in the following way.

The exact time retrieved from the UTC system cannot be encoded on 16 bits. The idea is then to make it so that this field encodes the UTC time with an accuracy of only 100 ms, modulo one hour.

Here, this field takes the value 36001 in the case where the following phase is more than an hour (and the value 65535 if the traffic lights are turned off). Otherwise, it takes a value between 0 and 36000. It will be noted that the values 36002 to 65534 will not be used.

The following example may thus be given.

If it is 14:00 and the following phase will occur in less than an hour, at 14 h40 mn52 s300 ms, then the field will take the value: 40*60*10+52*10+3=24523 (i.e. 0x5FCB).

At this stage, it will be noted that the messages are sent over the CAN, this allowing the client to acquire a relevant portion of the artificial horizon and to correctly perform the function for which it was designed.

In this way, and by way of non-limiting example, the navigation system will be able to select a route that best avoids traffic jams, an ADAS will be able to regulate the speed of the vehicle in order to take account of the phases of traffic lights and of black ice, and the human-machine interface (HMI) will be able to display on the instrument panel alerts to draw the attention of the driver to hazards.

It will be noted here that only some of the messages will potentially be sent over the network. Thus, filtering will potentially be carried out in order to send only long messages related to events located in proximity to the vehicle, for example within a range of less than 2 km from the latter.

More precisely here, this filtering will potentially consist in sending long messages corresponding to static events only if the event is located at a distance from the vehicle 10 less than a first threshold, which first threshold is less than the range over which the client receives mapping-related information.

It will potentially further consist in sending long messages corresponding to dynamic events only if the event is located at a distance from the vehicle 10 less than a second threshold, which second threshold is less than the first threshold.

This filtering will potentially further consist in transmitting only long messages associated with events that are located either on the primary path 102, or on secondary paths but at less than 200 m from the point where they branch off from the primary path 102.

The present invention is in no way limited to the embodiment described and shown, and those skilled in the art will be able to implement any variant according to the invention.

By way of example, a traffic-light event could not be used. In contrast, provision could be made to define a higher number of categories of temporary events (near static, far static, near dynamic, far dynamic, etc.).

The invention claimed is:

1. A method for preparing an artificial horizon for a motor vehicle, the method comprising:

receiving input data relating to the motor vehicle and to an environment of the motor vehicle;

determining various paths able to be taken by the motor vehicle; and generating messages characterizing said artificial horizon, the messages including a long message associated with a temporary event found on any of the paths, each long message containing a plurality of fields, including a first field relating to a type of an attribute characterizing the temporary event and a second field indicating a value of the attribute, wherein the first field of the long message is configured to take at least two separate predetermined values indicating a corresponding number of respective predefined categories of temporary events, said categories being defined by a speed of the temporary event and/or a position of the temporary event relative to the motor vehicle, wherein the speed and the position of the temporary event are different from a speed and a position of the motor vehicle, respectively.

2. The preparing method as claimed in claim 1, wherein the predefined categories of temporary events include dynamic events, events that are static or almost static with respect to the motor vehicle, and traffic lights, wherein each of the predefined categories has a different corresponding predetermined value in the first field of the long message.

3. The preparing method as claimed in claim 2, wherein the temporary event is one of the dynamic events when the speed of the temporary event is greater than a first threshold and/or when a distance to the motor vehicle is greater than a second threshold.

4. The preparing method as claimed in claim 3, wherein the first threshold and/or the second threshold is a function of a speed of the motor vehicle and/or of the speed of the temporary event and/or of the environment.

5. The preparing method as claimed in claim 2, wherein, when the speed and/or a distance to the motor vehicle of the temporary event varies over time, the value of the first field is configured to change.

6. The preparing method as claimed in claim 2, wherein at least one of the following events is a dynamic event:

a responding emergency vehicle, a first vehicle, an emergency braking system of which is activated, a second vehicle, a reversible occupant restraint system of which is activated, a person or animal on a path, mobile roadworks on the path, a third vehicle driving contraflow, mobile rescue and recovery work in progress, a fourth vehicle driving at least one third slower than the maximum permissible speed, a fifth vehicle causing a risk of collision, a sixth vehicle violating traffic laws, a dangerous situation.

7. The preparing method as claimed in claim 2, wherein at least one of the following events is a static event:

an accident, roadworks, an impassable path segment, adverse weather conditions, an area where aquaplaning has been observed, a hazardous area, an area where rescue and recovery work is in progress, a stationary vehicle, a dangerous end of queue.

8. The preparing method as claimed in claim 1, wherein each long message associated with one of the categories of temporary events contains two fields allowing each temporary event to be identified in two separate ways.

9. The preparing method as claimed in claim 1, wherein the input data are at least partly derived from a decentralized event notification message (DENM) and/or a co-operative awareness message (CAM) sent by a third-party vehicle.

10. A motor vehicle, comprising:

software clients, among which are a human-machine interface, or a navigation system, and/or advanced driver-assistance systems; and a main interface that is programmed to implement the preparing method as claimed in claim 1 in order to deliver to each of the software clients at least one portion of the prepared artificial horizon.

11. The method of claim 1, wherein the messages follow a modification of the Advanced Driver-Assistance Systems Interface Specification (ADASIS) protocol in which particular values of a profile type field of the ADASIS protocol are modified to designate dynamic events, static events, and a state of a traffic light.

* * * * *